United States Patent [19]
Bhatia

[11] Patent Number: 6,052,591
[45] Date of Patent: *Apr. 18, 2000

[54] BROADCASTING MESSAGES TO MOBILE STATIONS WITHIN A GEOGRAPHIC AREA

[75] Inventor: Ranjit Bhatia, Dallas, Tex.

[73] Assignee: Ericsson Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/699,661

[22] Filed: Aug. 19, 1996

[51] Int. Cl.⁷ ......................................... H07Q 7/00
[52] U.S. Cl. ..................... 455/445; 455/15; 340/825.03; 340/825.44; 380/23
[58] Field of Search ...................... 455/445, 432, 455/436, 439; 340/825.03, 825.44; 380/23

[56] References Cited

U.S. PATENT DOCUMENTS

| | | | |
|---|---|---|---|
| 4,696,051 | 9/1987 | Breeden | 455/33 |
| 4,968,966 | 11/1990 | Jasinski et al. | 340/825.44 |
| 5,128,934 | 7/1992 | Jasinski | 370/84 |
| 5,131,020 | 7/1992 | Liebesny et al. | 379/59 |
| 5,159,701 | 10/1992 | Barnes et al. | 455/15 |
| 5,241,305 | 8/1993 | Fascenda | 340/825.44 |
| 5,255,308 | 10/1993 | Hashimoto et al. | 379/61 |
| 5,260,986 | 11/1993 | Pershan | 379/57 |
| 5,369,682 | 11/1994 | Witsaman et al. | 379/57 |
| 5,404,571 | 4/1995 | Makowski | 455/33.1 |
| 5,450,405 | 9/1995 | Maher et al. | 370/58.2 |
| 5,550,896 | 8/1996 | Chavez, Jr. . | |
| 5,557,606 | 9/1996 | Moon et al. | 370/31 |
| 5,596,315 | 1/1997 | Olds et al. | 340/825.03 |
| 5,615,267 | 3/1997 | Lin et al. | 380/23 |
| 5,619,552 | 4/1997 | Karppanen et al. . | |
| 5,724,658 | 3/1998 | Hasan | 455/445 |
| 5,742,668 | 4/1998 | Pepe et al. . | |

FOREIGN PATENT DOCUMENTS

| | | |
|---|---|---|
| WO 94/09599 | 4/1994 | WIPO . |
| WO 96/20572 | 7/1996 | WIPO . |

OTHER PUBLICATIONS

Arunkumar, Panwar, "Efficient Broadcast Using Selective Flooding", INFOCOM'92, May 1992.

The Short Message Service—A New Service of Digital Mobile Communication Michael Hientz, et al., United States Patent and Trademark Office Washington, D.C.—May 1995, pp. 1–15.

F. Courau, et al., "Implementation of Broadcast and Personal Message Services in an Experimental Mobile Radio System", XP002019072, CNet, France, Jun. 30, 1997, p. 144–151.

*Primary Examiner*—William Cumming
*Attorney, Agent, or Firm*—Jenkens & Gilchrist, PC

[57] ABSTRACT

A dialable directory number is assigned to a particular location area or cell area. A telecommunications user wanting to transmit user defined messages, such as a text message, to mobile stations within that location area or cell area transmits a signal encapsulating the message towards the assigned directory number. The transmitted signal is then routed through the conventional telecommunications network and delivered to the MSC providing mobile service to that particular location area or cell area. If the specified directory number is associated with a location area within a Public Land Mobile Network (PLMN), the serving MSC queries the attached visitor location register (VLR) to identify the mobile stations currently located within the specified location area. If the specified directory number is associated with a cell area, the serving MSC communicates with a base station controller (BSC) providing mobile service to that particular cell area. Thereinafter, the received message is transmitted using short message service (SMS) messages to each of the mobile stations determined to be located within the specified geographic area.

21 Claims, 12 Drawing Sheets

BROADCASTING MESSAGES TO MOBILE STATIONS WITHIN A GEOGRAPHIC AREA

BACKGROUND OF THE INVENTION

1. Technical Field of the Invention

The present invention relates to a mobile telecommunications network and, in particular, to the broadcasting of messages to mobile stations traveling within a particular geographic area.

2. Description of Related Art

With the introduction of the Global System for Mobile (GSM) communication and the Personal Communications System (PCS), a number of advanced subscriber features and applications are provided to mobile subscribers. One such application is the communication of unstructured data between a mobile station and a serving mobile telecommunications network. Messages like Short Message Service (SMS) messages are utilized to communicate text or unstructured data between a serving mobile switching center (MSC) and a mobile station. Using SMS messages, the serving MSC can transmit text information to the mobile station and have the mobile station store the received text information in an associated register, such as an attached Subscriber Identity Module (SIM) card. The text messages encapsulated within the received SMS messages can then be displayed to the mobile user for user interaction.

Another example of unstructured data communications comprises the Unstructured Supplementary Service Data (US:SD) message. Using USSD messages, a mobile telecommunications network is also able to transparently communicate text data with a mobile station. For example, a mobile station can receive and display text messages on an attached display unit and subsequently return a reply message back to the mobile network.

Conventionally, SMS and USSD messages can be utilized to communicate unstructured data, e.g., user defined text messages, from a mobile telecommunications network to a particular mobile station or to all mobile stations traveling within a particular mobile switching center (MSC) coverage area. As a result, in order to communicate messages to mobile stations located within a certain geographic area, the mobile telecommunications network must individually identify and specify the Mobile Subscriber Integrated Service Digital Network (MSISDN) number associated with each of the targeted mobile stations and sequentially transmit a message to the specified mobile stations. As an alternative, the serving MSC can also blindly transmit broadcast messages to all mobile stations located within its MSC service area.

However, there are situations where it would be advantageous to broadcast messages to mobile stations located within a selected geographic location or within a particular MSC coverage area. For example, a business owner may wish to broadcast advertising messages to all mobile stations located within the immediate vicinity of the business premises. As another example, an emergency service provider, such as the Emergency Service Bureau (ESB) or more commonly known in the United States as 9-1-1 service, may wish to broadcast emergency messages to mobile stations located only within a particular geographic area affected by an emergency crisis.

Accordingly, there is a need to enable the mobile telecommunications network to selectively broadcast connection-less signals, such as SMS or USSD messages, to mobile stations located within a particular geographic area.

SUMMARY OF THE INVENTION

The present invention discloses a method and system for selectively broadcasting messages to mobile stations traveling within a particular geographic area within a serving mobile switching center (MSC) coverage area. An MSC or base station controller (BSC) providing mobile service for a particular geographic area is assigned a unique identification number. Such a unique identification number includes a Mobile Subscriber Integrated Service Digital Network (MSISDN) number and a wireline directory number representing that particular MSC or BSC.

Utilizing the specified unique identification number as destination address, a signal encapsulating data to be transmitted to the mobile stations located within that particular geographic area is routed to the MSC or BSC associated with that unique identification number. If the unique identification number is associated with a particular MSC, it is further analyzed to determine which location area is associated with the received unique identification number. After making such a determination, the serving MSC performs a query with the associated visitor location register (VLR) to identify the mobile stations located within the specified location area. Thereinafter, a Short Message Service (SMS) or Unstructured Supplementary Service Data (USSD) message encapsulating the received data is transmitted to each of the identified mobile stations.

If the received unique identification number is associated with a BSC, the associated MSC sends the data to the serving ESC. The serving BSC then determines the particular cell area represented by the received unique identification number and further identifies the mobile stations located within the determined cell area. Thereinafter, the serving BSC or the MSC transmits an SMS or USSD message encapsulating the received data to each of the mobile stations located within the identified cell area.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
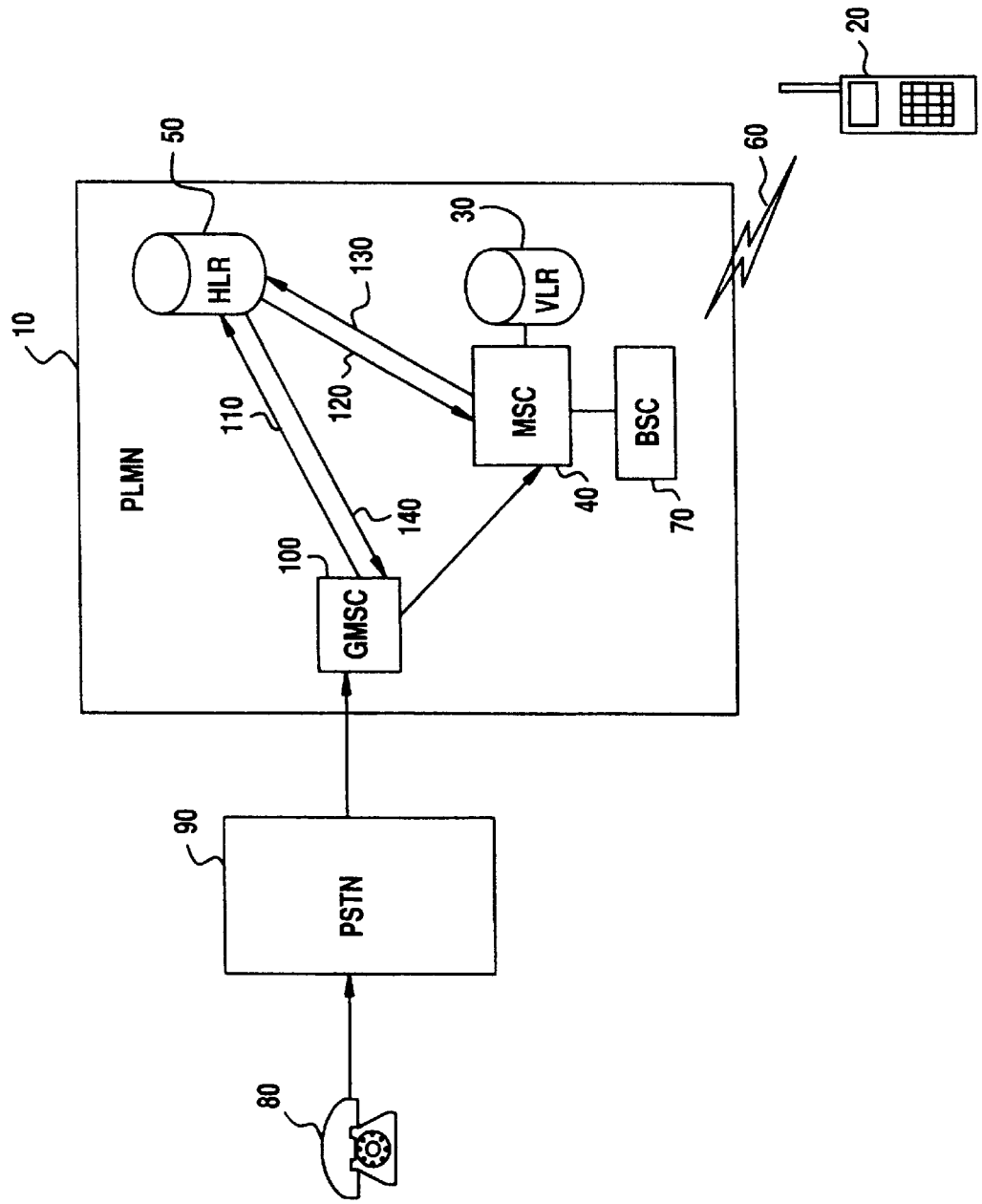
FIG. 1 is a block diagram of a telecommunications network including a Public Land Mobile Network (PLMN) for providing mobile service to a mobile station.

FIG. 1 is a block diagram of a telecommunications network including a Public Land Mobile Network (PLMN) 10 for providing mobile service to a mobile station 20. Whenever the mobile station 20 travels into a particular mobile switching center (MSC) coverage area, a visitor location register (VLR) 30 associated with the serving MSC 40 copies into its memory the relevant subscriber information from the home location register (HLR) 50 associated with that particular mobile subscriber. Thereinafter, whenever the mobile station 20 originates an outgoing call, the radio signal 60 requesting an outgoing call setup is received by the base station controller (BSC) 70 connected to the serving MSC 40. The received request is then forwarded to the serving MSC 40 who, in turn, processes the call setup request with the help of the subscriber information stored in the VLR 30. If the outgoing call connection is towards a wireline terminal 80, the call setup signal, such as an Initial Address Message (IAM) signal, is then transmitted from the serving MSC 40 to the connected Public Switched Telephone Network (PSTN) 90 to establish the call connection.

For incoming calls, such an a call originated from the wireline terminal 80 towards the mobile station 20, the call setup signal is initially routed from the PSTN 90 to a gateway mobile switching center (GMSC) 100 associated with the serving PLMN 10. The GMSC 100, in turn, performs an IILR interrogation to determine the location of the mobile station 20 by transmitting a signal requesting routing information to the HLR 50 (signal 110). The HLR 50 (which stores subscriber information and keeps track of the current location of the mobile station 20) further transmits a signal requesting a roaming number to the MSC 40 currently serving the mobile station 20 (signal 120). As a result, the serving MSC 40 identifies the mobile station 20 and returns a roaming number to the HLR 50 (signal 130). The HLR 50, in turn, forwards the received roaming number representing the network address of the serving MSC 40 back to the requesting GMSC 100 (signal 140). Utilizing the received roaming number, the GMSC 100 then reroutes the received call setup signal to the specified MSC 40. The serving MSC 40 then pages the mobile station 20 and establishes a call connection over a traffic channel (TCH).

Figure 2:
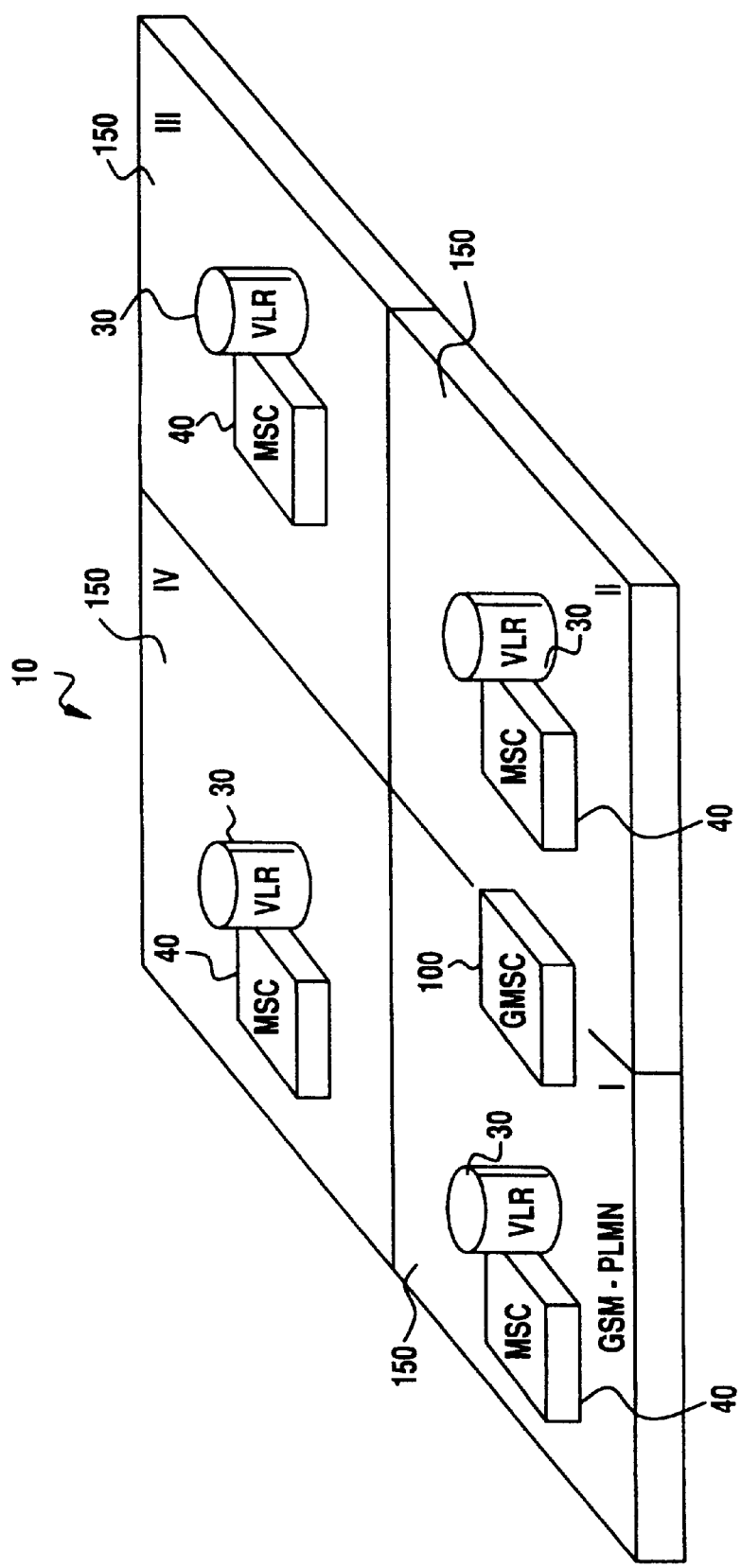
FIG. 2 is a diagram illustrating a single Public Land Mobile Network (PLMN) comprising multiple Mobile Switching Center (MSC) areas.

Reference is now made to FIG. 2 where a layout of multiple MSC areas 150 within a particular PLMN 10 is illustrated. A PLMN network 10 is a complex configuration comprising multiple MSCs 40, VLRs 30, HLRs (not shown in FIG. 2), GMSC 100, etc. In order to properly switch a call to a mobile station located within a particular PLMN, the correct entities and devices need to be invoked and involved in a call process. The individual PLMN 10 may contain parts of one or more single Local Access Transport Areas (LATA). There are over three hundred LATAs presently defined throughout the United States. As shown in FIG. 2, within each LATA, there are multiple MSC/VLR areas 150 each being served by an individual MSC/VLR (usually there is a one-to-one relationship between an MSC 40 and its VLR 30 and is often referenced collectively as a MSC/VLR).

Figure 3:
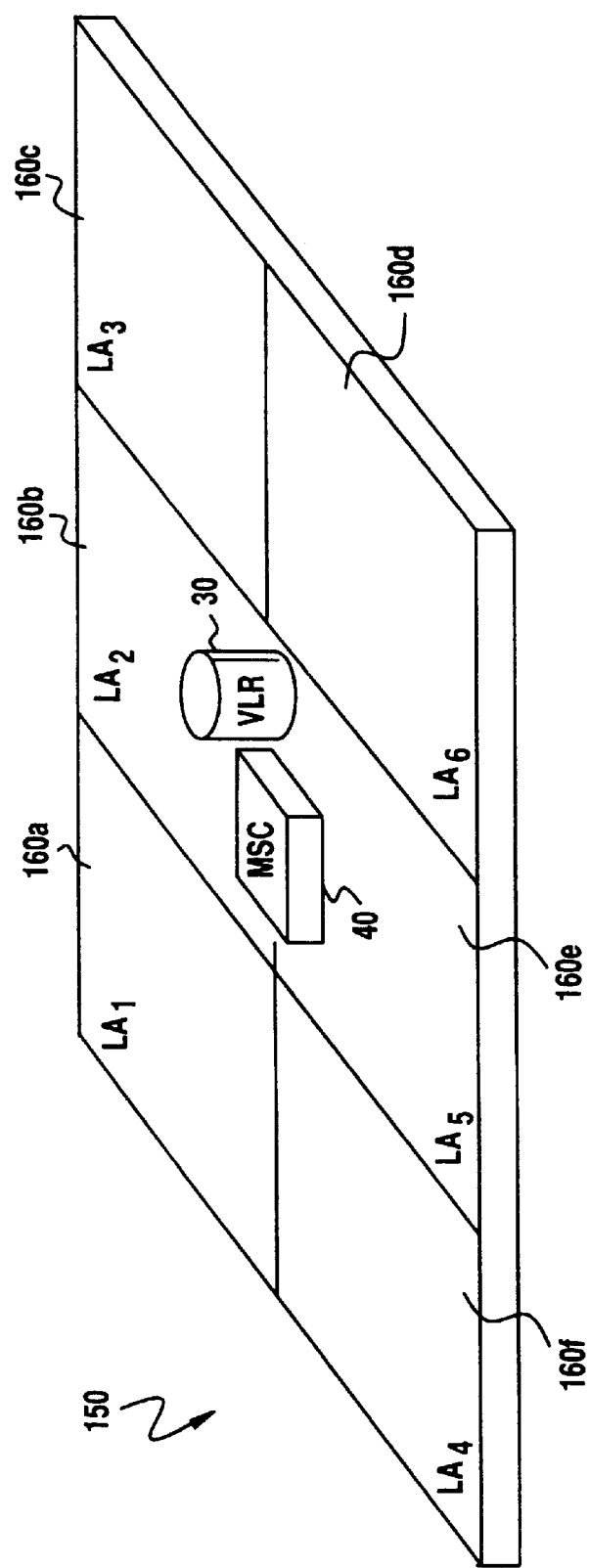
FIG. 3 is a diagram illustrating a single MSC further comprising multiple location areas (LA)

FIG. 3 illustrates multiple location areas 160a–160f within a particular MSC area 150. A location area is a part of the MSC service area in which a mobile station may move freely without updating location information to the MSC/VLR serving that location area. Therefore, a location area is the area where a paging message is broadcast to find the called mobile station for an incoming call. A location area identity (LAI) which identifies each location area is used by the mobile network to search for a mobile station in active state.

Figure 4:
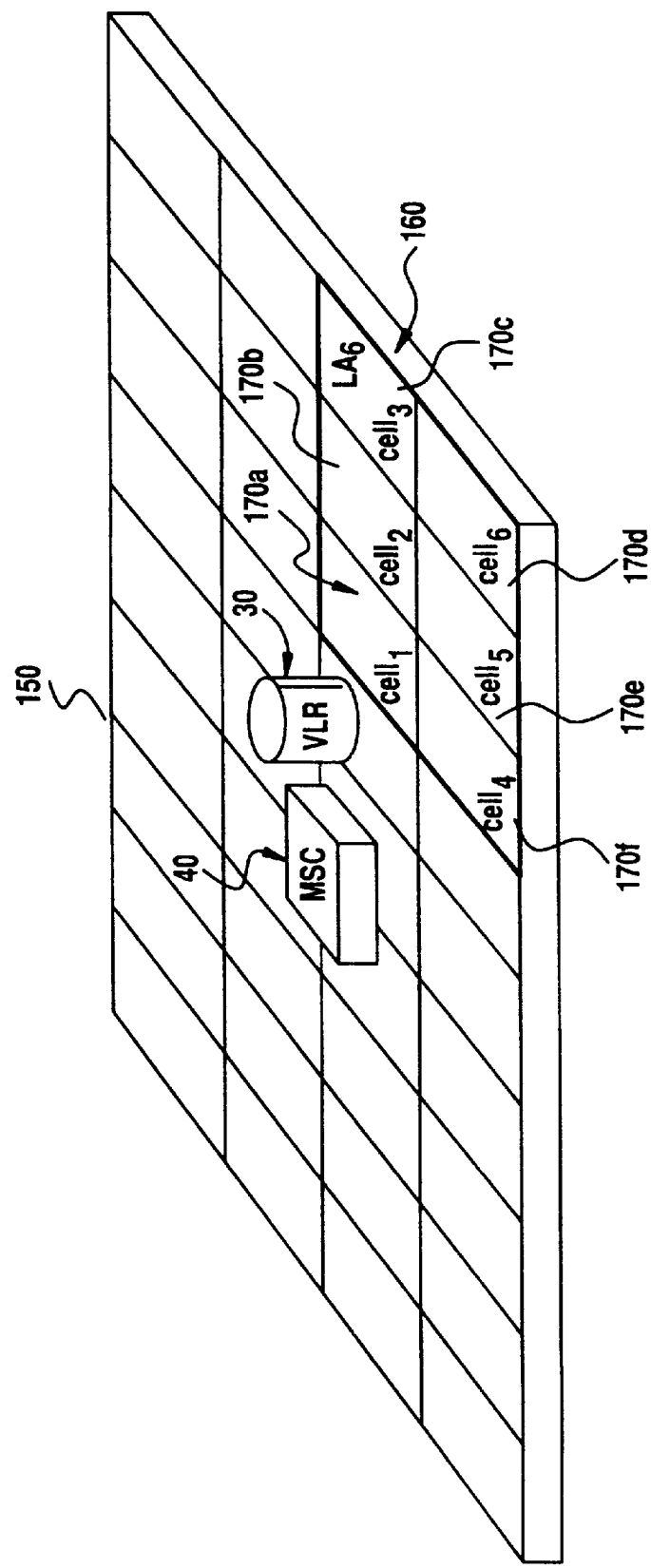
FIG. 4 is a diagram illustrating a single location area further comprising multiple cell areas (CA)

Further referring to FIG. 4, each location area 160 within a particular MSC coverage area 150 is further divided into multiple cell areas 170a–170f. Each cell is served by a separate antenna or base station. However, as described above, all cells within a single location area are served by the same MSC 40 and VLR 30. As a result, different cell areas 170 within a single location area 160 are distinguished using a Base Station Identity Code (BSIC) assigned to each serving base station or a Cell Global Identity (CGI) or Cell Identity (CI) assigned to each cell.

Signaling for telecommunications services is normally performed in a structured way. For example, specific predefined data, formats, and signals names are used to setup a speech connection, to perform handovers, and to authenticate mobile subscriber information when providing telecommunications service to a mobile subscriber. With the introduction of the Global System for, Mobile (GSM) communications and the Personal Communications System (PCS), a number of new and advanced supplementary services are being provided to mobile subscribers. Since these supplementary services utilize user specified data, there are no structured ways to communicate these data between a serving Public Land Mobile Network (PLMN) and a mobile station. As a result, a number of unstructured message protocols have been developed for the GSM or PCS environment. One such protocol is the Short Message Service (SMS) protocol for one-way transporting of information between a PLM and a mobile station. Another protocol is Unstructured Supplementary Service Data (USSD) which has been introduced to enable user interaction between GSM PLMN applications and a mobile station in a transparent way through the mobile telecommunications network. It is transparent because no review or manipulation of the contents of the message is performed during transportation.

Figure 5:
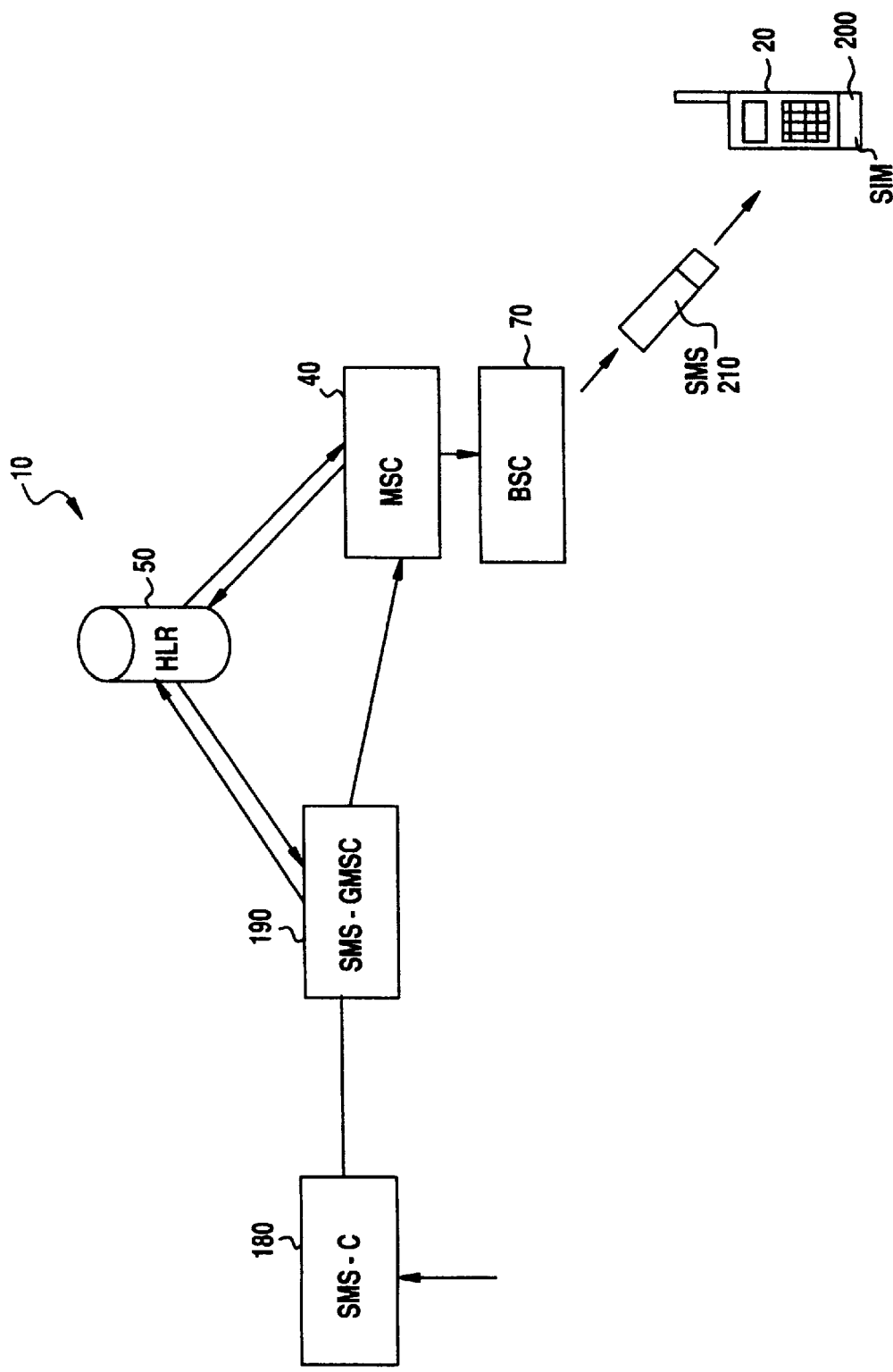
FIG. 5 is a block diagram illustrating the routing of a Short Message Service (SMS) message within a PLMN.

Reference is now made to FIG. 5 where a block diagram illustrating the communication of a Short Message Service (SMS) message between a Short Message Service Center (SMS-C) 180 and the mobile station 20 is shown. The SMS-C 180 receives a string of alphanumeric characters to be transmitted to the mobile terminal 20. Such characters can be received from another telecommunications terminal or from a service operator. The SMS-C 180 encapsulates the entered character data into a packet message, such as Signaling System No. 7 (SS7) signals or X.25 protocol packets, and routes the message to a Short Message Service— Gateway Mobile Switching Center (SMS-GMSC) 190 within a PLMN 10 serving the mobile station 20. In a manner similar to the routing of an incoming call within a PLMN as described in FIG. 1, the SMS-GMSC 190 interrogates the home location register (HLR) 50 associated with the mobile station 20 for routing information (i.e., an identification of where the mobile station 20 is currently located) and subsequently routes the message to a Mobile Switching Center (MSC) 40 serving the mobile station's current location. The mobile station 20 is paged and a connection is set up between the mobile station 20 and the PLMN network 10. If the mobile station 20 is already busy, the connection setup is not performed because the network already knows that the mobile station 20 is accessible. If the connection has been successful, and thereby the mobile station 20 authenticated, the MSC 40 encapsulates the character data into an SMS message 210 and delivers the SMS message 210 to the mobile station 20 over one of the control data channels via a connected base station controller (BSC) 70. A control data channel such as a Stand-alone Dedicated Control Channel (SDCCH) is used instead of a traffic channel (TCH) to allow connection-less data communications. After receiving the EMS message 210 encapsulating the character data, the mobile station 20 acts merely as a buffer and passes the data to the attached Subscriber Identity Module (SIM) card 200. The SIM card 200 then stores the received data into an internal buffer or memory register. Lastly, if the delivery has been successful, a successful delivery report is sent back from the MS 20 to the serving MSC 40, and subsequently from the serving MSC 40 to the SMS-C 180. Otherwise, a failure report is generated.

By utilizing SMS messages and an SIM card, a subscriber feature provider within a telecommunications network can deliver the latest subscriber feature information to the mobile station 20 without requiring the mobile station 20 to be taken in for manual service. For example, whenever the mobile subscriber adds or deletes a new number from his speed dialing subscriber feature, the feature provider can remotely update the mobile station 20 with the mobile subscribers latest speed dialing lists or options without inconveniencing the mobile subscriber. An application module associated with the mobile station 20 can further process and display the received data on a display unit attached to the mobile station 20 for user interaction.

Figure 6:
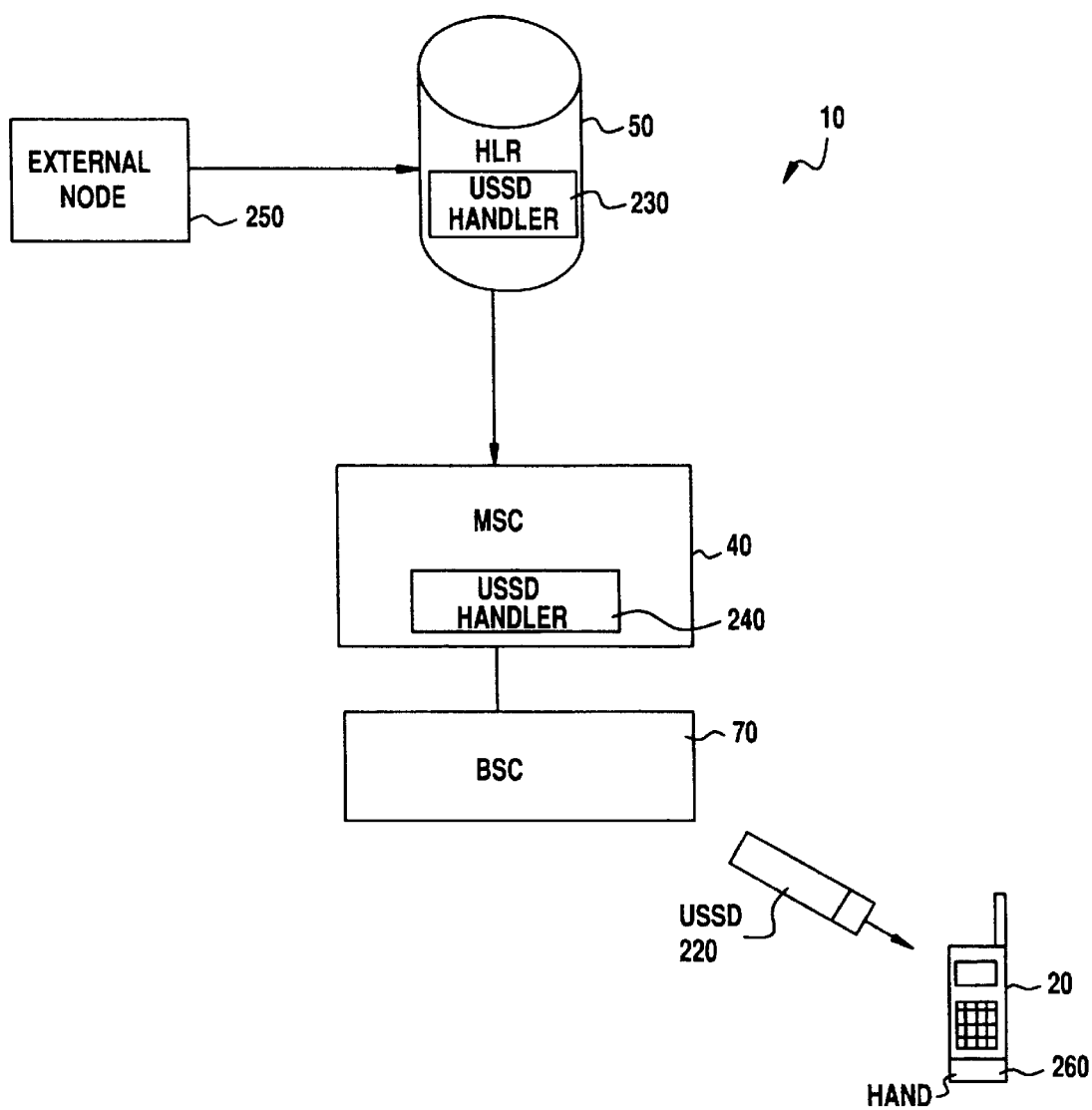
FIG. 6 is a block diagram illustrating the routing of a Unstructured Supplementary Service Data (USSD) message within a PLMN.

FIG. 6 is a block diagram illustrating the communication of a USSD message 220 between a USSD external node user 250 and a mobile station 20. USSD messages are utilized by the mobile telecommunications network to transport user defined data to a mobile station 20 or an application module within the mobile station 20. Therefore, instead of storing the received character data into an SIM card, the received data are either directly manipulated by the feature application modules within the receiving mobile station 20 to provide special subscriber feature functions or displayed on a display unit for user interaction. Therefore, two parties within a mobile telecommunications network can utilize USSD messages to communicate text messages back and forth without establishing a speech connection.

The external node user 250, such as another telecommunications terminal or service provider, transmits a USSD message encapsulating the character data to the HLR 50 within the serving PLMN 10. The HLR 50 is associated with a number of different MSCs within the same PLMN 10. As the mobile station 20 travels from one MSC area to another, the HLR 50 receives location update signals and keeps record of the mobile station's current location. Whenever a USSD signal is received by the HLR 50, the HLR 50 ascertains the current location of the mobile station 20. A first USSD handler 230 within the HLR 50 thereafter transparently forwards the USSD signal to the appropriate MSC 40 currently serving the mobile station 20. A second USSD handler 240 within the serving MSC 40 receives the transmitted message and transports the USSD message 220 to the mobile station 20 over a connection-less communications link via a connected BSC 70. A third USSD handler 260 within the mobile station 20 then receives the transmitted USSD message 220, extracts the encapsulated character data, and forwards the extracted data to the appropriate application module. One example of such an application module is a user interface module for displaying the received character data onto a display unit attached to the mobile station 20.

Conventionally, SMS and USSD messages are utilized to communicate user defined text messages from a telecommunications device within a telecommunications network to a particular mobile station or to all mobile stations traveling within a particular mobile switching center (MSC) coverage area. As a result, in order to communicate messages to mobile stations located within a certain geographic area, the telecommunications device generating the messages must inefficiently and inconveniently identify and specify the Mobile Subscriber Integrated Service Digital Network (MSISDN) number associated with each of the targeted mobile stations and sequentially transmit a message to the specified mobile stations. In order to avoid sequentially sending the message to each mobile station, as an alternative, the serving MSC can blindly transmit broadcast messages to all mobile stations located within its MSC service area.

Figure 7:
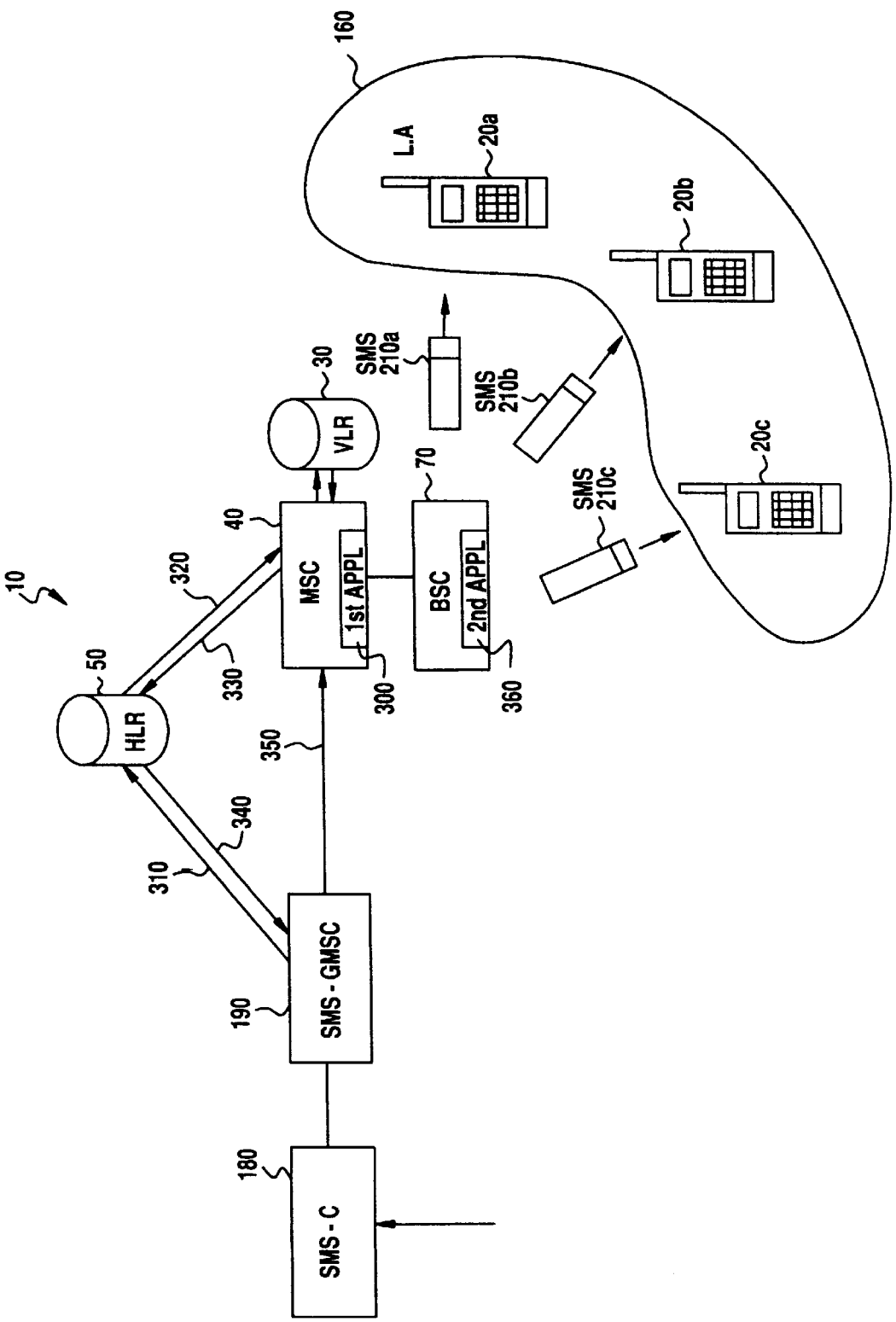
FIG. 7 is a block diagram illustrating the broadcasting of SMS messages to mobile stations located within a particular location area.
Figure 12:
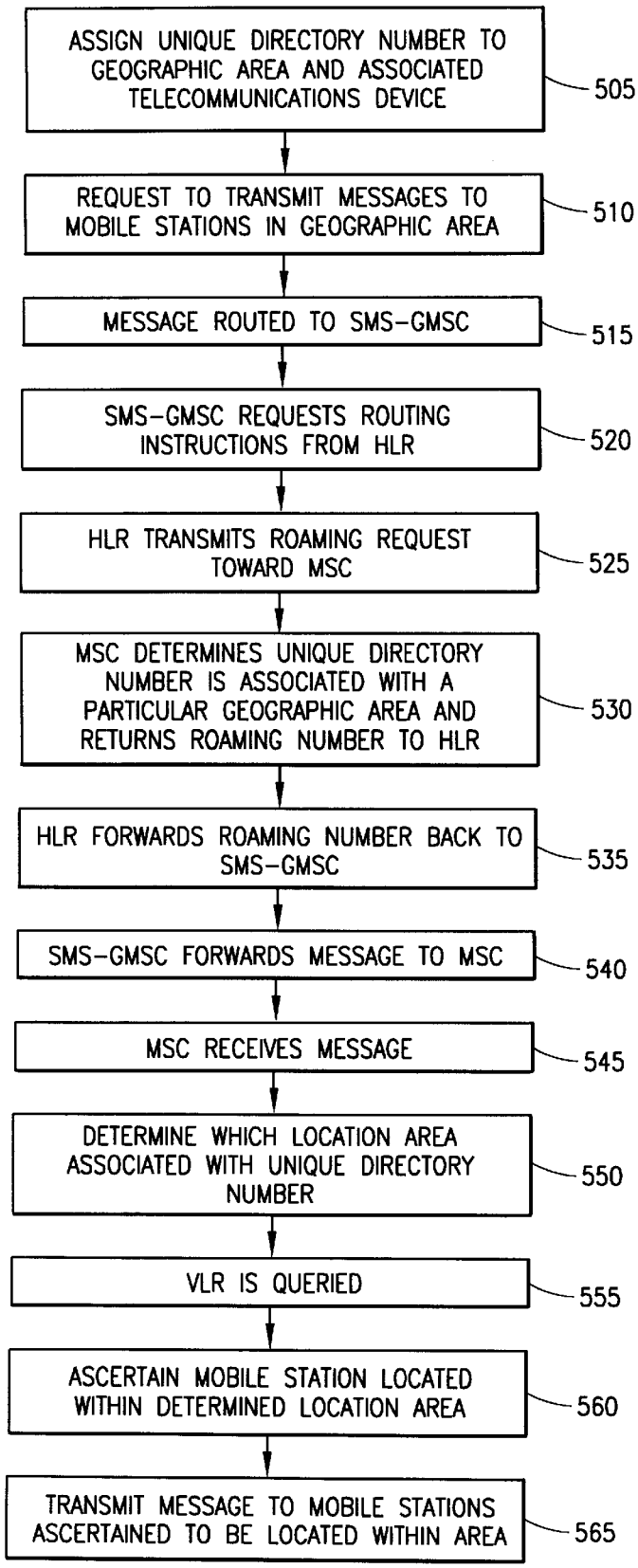
FIG. 12 is a flow diagram illustrating the method of the present invention.

Reference is now made to FIG. 7 illustrating the broadcasting of SMS messages to mobile stations located within a particular location area in accordance with the present invention. In accordance with the teachings of the present invention, a Mobile Subscriber Integrated Service Digital Network (MSISDN) number is assigned to a particular geographic area and associated with a telecommunications device serving that particular geographic area (FIG. 12, step 505). Thereinafter, whenever a telecommunications user wishes to transmit a message to all mobile stations located within the designated geographic area (FIG. 12. step 510, an SMS message encapsulating the message is routed utilizing the MSISDN number assigned to that particular geographic area as the destination address. For example, the SMS-C 180 receives a request to transmit an SMS message towards the MSISDN number associated with a particular location area. Not knowing that the specified MSISDN number represents a geographic location instead of a mobile station, the message is first routed to the SMS-GMSC 190 serving that particular PLMN 10 (FIG. 12. step 515). In a manner similar to the routing of a normal incoming SMS message, the SMS-GMSC 190 requests a routing instruction from the HLR 50 associated with the specified MSISDN number (signal 310); FIG. 12, step 520). The HLR 50, storing a record specifying that the specified MSISDN number is being served by a particular MSC 40, further transmits a roaming number request towards the serving MSC 40 (signal 320); FIG. 12, step 525). Up to this process, no entity or device within the PLMN has determined that the specified MSISDN number does not represent a mobile station. The serving MSC then determines that the received MSISDN number is a number associated with a particular geographic area and, in order to receive the SMS message, returns a roaming number to the HLR 50 (signal 330); FIG. 12, step 530). The HLR 50 further forwards the received roaming number representing the serving MSC 40 back to the SMS-GMSC 190 (signal 340); FIG. 12, step 535). Utilizing the received roaming number, the SMS-GMSC 190 forwards the SMS message to the serving MSC 40 (FIG. 12, step 540). Upon receiving the SMS message (FIG. 12, step 545), a first application module 300 associated with the serving MSC 40 determines which location area is associated with this particular MSISDN number (FIG. 12. step 550). After making such a determination, the application module 300 queries the attached VLR 30 (FIG. 12, step 555). The attached VLR 30 already stores information reflecting which location area each mobile station is currently registered with. Accordingly, by querying the VLR 30, the serving MSC is able to ascertain the MSISDN numbers of the mobile stations located within the determined location area (FIG. 12, step 560).

Thereinafter, the received SMS message can be transmitted to each of the determined mobile stations (FIG. 12, step 565) in a number of different ways. In order to make minimum changes to the existing system, the first application module 300 within the serving MSC 40 can individually and sequentially transmit a message to each of the identified mobile stations using its corresponding MSISDN number. The serving MSC 40 sequentially instructs the serving BSC 70 to page each of the mobile stations 20a–20c and separately transmits the SMS message 210a–210c to the mobile stations 20a–20c, respectively. As another embodiment of the present invention, the first application module 300 within the serving MSC 40 can further transmit the received SMS data along with a list of MSISDN numbers to the BSC 70 serving that particular location area 160. A second application module 360 associated with the serving BSC 70 then transmits the received SMS data to each of the mobile stations as specified in the received MSISDN list.

Accordingly, the Emergency Service Bureau (ESB) can transmit emergency messages to all mobile stations located within a particular location area by transmitting an EMS message towards the MSISDN number associated with that particular location area. Once the message reaches an MSC serving that particular location area, the mobile stations currently traveling within the targeted location area are determined by querying the VLR and the emergency message is accordingly transmitted to each of the identified mobile stations.

A MSISDN number as described in FIG. 7 is assigned to a particular location area in order to reduce the impact to the existing SMS routing mechanism. The SMS-GMSC only receives MSISDN numbers and always requests routing instructions from an HLR associated with the received MSISDN number. As a result, even if the location area specified by the MSISDN number can never physically relocate to a different place, an HLR needs to be associated with the specified MSISDN number and be interrogated by the GMSC.

Figure 8:
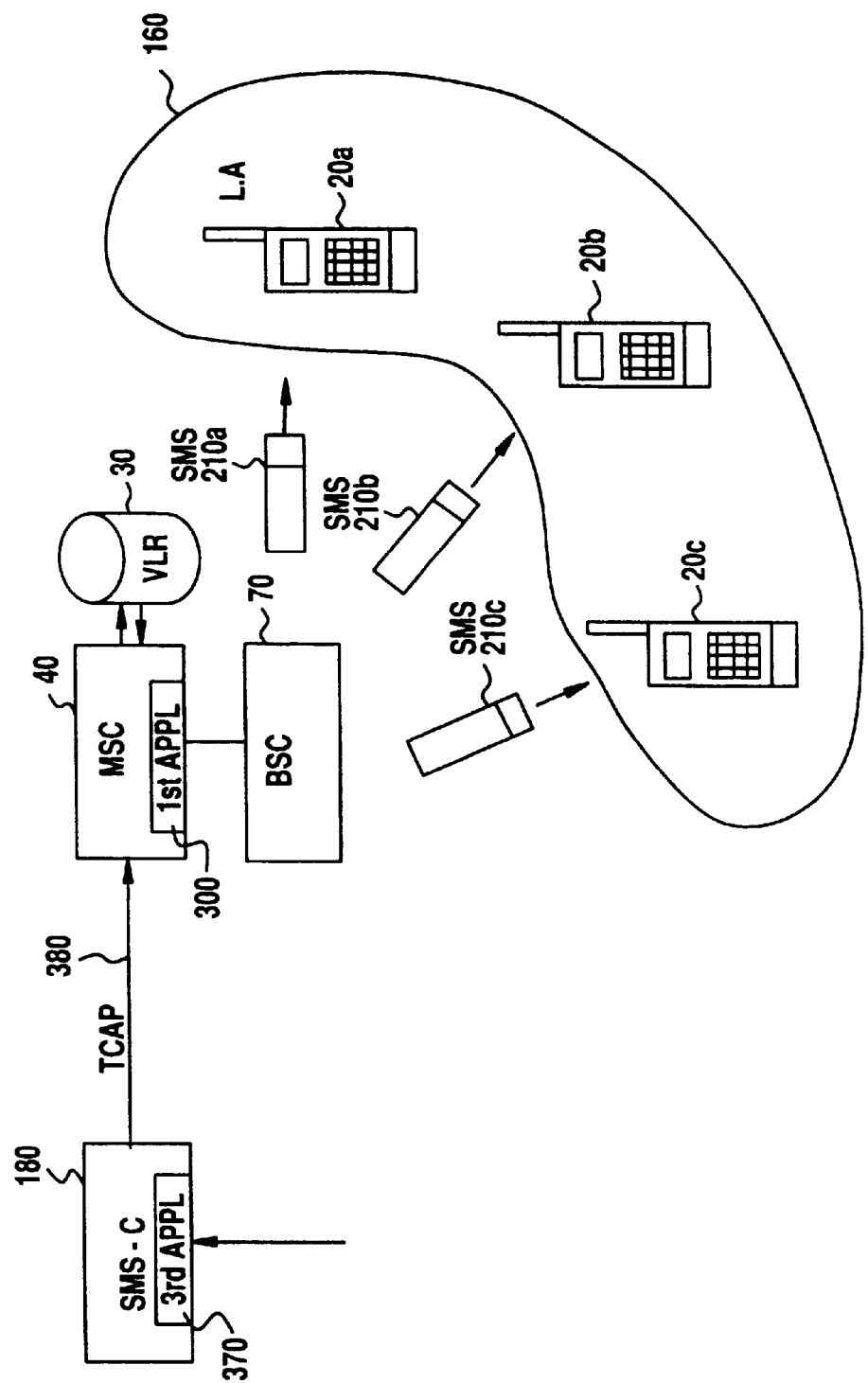
FIG. 8 is a block diagram illustrating the broadcasting of SMS messages to mobile stations located within a particular location area without performing a home location register (HLR) interrogation.

However, as another embodiment of the present invention, reference is now made to FIG. 8 illustrating the broadcasting of SMS messages to mobile stations located within a particular location area without performing a home location register (HLR) interrogation. Instead of assigning a MSISDN number to a particular location area, a wireline directory number is assigned to the particular location area and associated with a telecommunications device serving that particular location area. Thereinafter, whenever the SMS-C 180 receives a request to route an SMS message to a wireline directory number, a third application module 370 within the SMS-C 180 determines that the specified directory number is not a mobile number and transmits an application layer message 380, such as a Transaction Capabilities Application Part (TCAP) message, encapsulating the SMS message directly towards the serving MSC 40 associated with the specified wireline directory number. This is accomplished by transmitting a TCAP message using the received wireline directory number as a Signal Connection Control Part (SCCP) destination address. After receiving the TCAP signal, the first application module 300 within the serving MSC 40 extracts the encapsulated message and determines which location area 160 is associated with the specified wireline directory number. Thereinafter, in a manner similar to the methods and systems as described in FIG. 7, SMS messages 210a–210c are transmitted to mobile stations 20a–20c, respectively, located within the identified location area 160.

Figure 9:
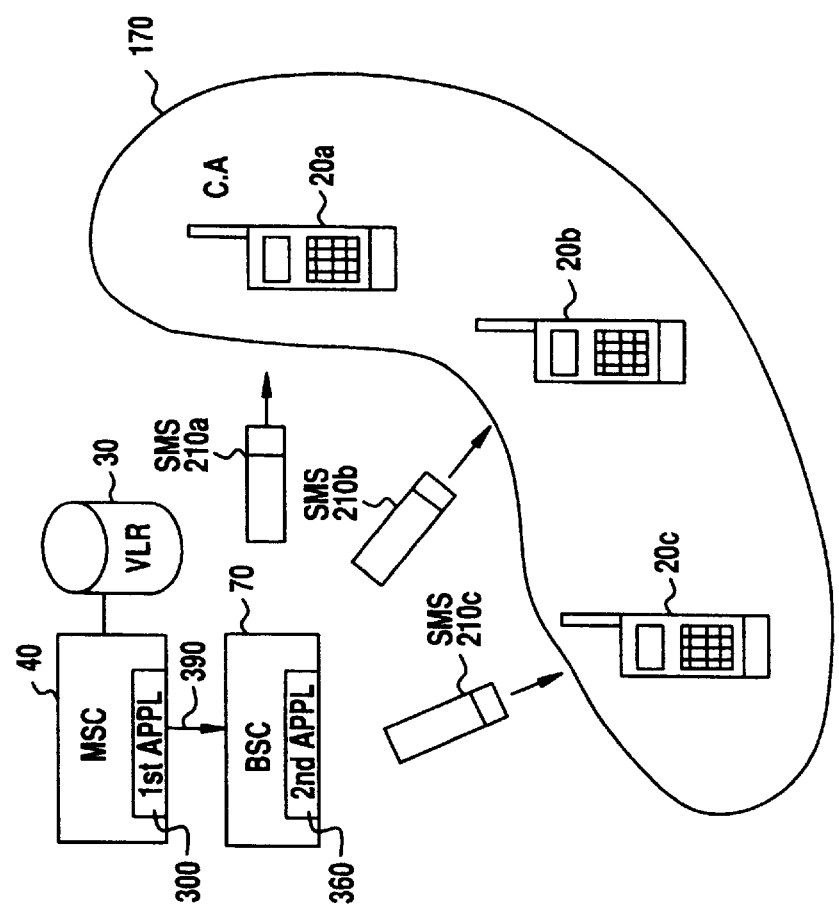
FIG. 9 is a block diagram illustrating the broadcasting of SMS messages from the serving base station controller (BSC) to mobile stations located within a particular cell area.

In accordance with the teachings of the present invention, a MSISDN number or wireline directory number can further be assigned to a particular cell area within a location area. Reference is now made to FIG. 9 illustrating the broadcasting of SMS messages to mobile stations located within a particular cell area 170. In case the directory number is assigned to a particular cell area, the SMS message is first routed to the MSC 40 serving that particular cell area. In a manner similar to storing data identifying the location area for each of the mobile stations traveling within a MSC coverage area, the attached VLR 30 further stores data identifying the cell area covering each mobile station. Such data may include Cell Global Identity (CG.I) or Cell Identity (CI) identifying each cell area. As a result, upon querying the VLR 30, the first application module 300 determines the identities of the mobile stations traveling within the specified cell area, and in a manner similar to the method and system as described above, SMS messages are broadcast to each of the identified mobile stations.

Alternatively, the serving BSC 70 providing mobile service to the particular cell area 170 maintains data identifying the mobile stations currently located within the specified cell area 170. Accordingly, the serving MSC 40 transmits the received SMS message directly to the serving BSC 70. The second application module 360 associated with the serving BSC 70, in turn, determines which mobile stations are currently located within its coverage area 170 and transmits SMS Messages 210a–210c to the mobile stations 20a–20c, respectively.

Figure 10:
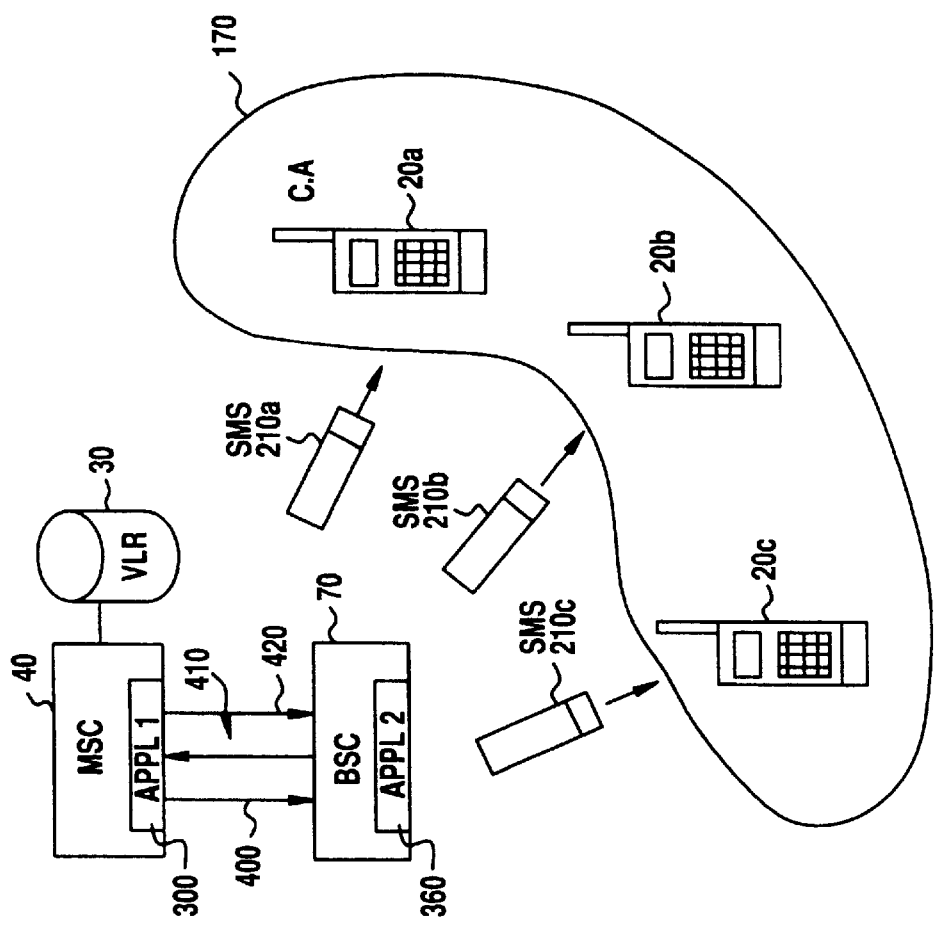
FIG. 10 is a block diagram illustrating the broadcasting of SMS messages from the serving mobile switching center (MSC) to mobile stations located within a particular cell area.

As another embodiment of the present invention, reference is now made to FIG. 10 illustrating the serving MSC transmitting SMS messages to mobile stations located within a particular cell area 170. After receiving an SMS message with a directory number associated with a particular cell area, the serving MSC 40 determines the BSC 70 associated with the specified cell area 170 and transmits a signal requesting the identities of mobile stations currently located with the specified cell area 170 to the serving BSDC 70 (signal 400). The second application module 360 within the serving BSC 70 ascertains the list of mobile stations currently being served by the BSC 70 and returns that list to the serving MSC 40 (signal 410). Utilizing the list of mobile stations received from the serving BSC 70, and in a manner similar to the method and system as described above, the serving MSC 40 transmits SMS messages 210a–210c to the mobile stations 20a–20c, respectively (signal 420).

As another alternative for broadcasting unstructured data to mobile stations, reference is now made to FIG. :L1 illustrating the broadcasting of USSD messages to mobile stations traveling within a particular service area. An external node 250, such as a service provider, transmits a USSD message encapsulating the unstructured data to be broadcast using the MSISDN number assigned to that particular service area as a called party number. The transmitted USSD message is routed to the HLR associated with the specified called party number (signal 440). The USSD handler 230 associated with the HLR 50 determines the identity of the MSC 40 associated with the specified MSISDN number and, in turn, forwards the USSD message to the serving MSC 40. The USSD handler 240 associated with the MSC 40 then extracts the encapsulated unstructured data from the received USSD message. In a manner similar to the broadcasting of SITS messages as described in FIGS. 7–10, an application module 460 associated with the serving MSC 40 then determines the identity of the mobile stations currently located within the specified service area and broadcasts the USSD messages 430a–430c to the mobile stations 20a–20c via the BSC 70, respectively. As described above, the service area specified by the received MSISDN number may include a MSC coverage area, location area, or a cell area within a particular location area.

As another embodiment of the present invention for broadcasting USSD messages, a wireline directory number is assigned to a service area. Instead of transmitting a USSD message to the HLR 50, a USSD message or other connection-less signal is transmitted directly from the external node 250 to the MSC 40 serving that particular service area. Once the signal is received by the serving MSC, as described above, the application module 460 broadcasts the received data to the mobile stations traveling within the specified location area.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

DETAILED DESCRIPTION OF THE DRAWINGS

FIG. 1 is a block diagram of a telecommunications network including a Public Land Mobile Network (PLMN) 10 for providing mobile service to a mobile station 20. Whenever the mobile station 20 travels into a particular mobile switching center (MSC) coverage area, a visitor location register (VLR) 30 associated with the serving MSC 40 copies into its memory the relevant subscriber information from the home location register (HLR) 50 associated with that particular mobile subscriber. Thereinafter, whenever the mobile station 20 originates an outgoing call, the radio signal 60 requesting an outgoing call setup is received by the base station controller (BSC) 70 connected to the serving MSC 40. The received request is then forwarded to the serving MSC 40 who, in turn, processes the call setup request with the help of the subscriber information stored in the VLR 30. If the outgoing call connection is towards a wireline terminal 80, the call setup signal, such as an Initial Address Message (IAM) signal, is then transmitted from the serving MSC 40 to the connected Public Switched Telephone Network (PSTN) 90 to establish the call connection.

For incoming calls, such an a call originated from the wireline terminal 80 towards the mobile station 20, the call setup signal is initially routed from the PSTN 90 to a gateway mobile switching center (GMSC) 100 associated with the serving PLMN 10. The GMSC 100, in turn, performs an .HLR interrogation to determine the location of the mobile station 20 by transmitting a signal requesting routing information to the HLR 50 (signal 110). The HLR 50 (which stores subscriber information and keeps track of the current location of the mobile station 20) further transmits a signal requesting a roaming number to the MSC 40 currently serving the mobile station 20 (signal 120). As a result, the serving MSC 40 identifies the mobile station 20 and returns a roaming number to the HLR 50 (signal 130). The HLR 50, in turn, forwards the received roaming number representing the network address of the serving MSC 40 back to the requesting GMSC 100 (signal 140). Utilizing the received roaming number, the GMSC 100 then reroutes the received call setup signal to the specified MSC 40. The serving MSC 40 then pages the mobile station 20 and establishes a call connection over a traffic channel (TCH).

Reference is now made to FIG. 2 where a layout of multiple MSC areas 150 within a particular PLMN 10 is illustrated. A PLMN network 10 is a complex configuration comprising multiple MSCs 40, VLRs 30, HLRs (not shown in FIG. 2), GMSC 100, etc. In order to properly switch a call to a mobile station located within a particular PLMN, the correct entities and devices need to be invoked and involved in a call process. The individual PLMN 10 may contain parts of one or more single Local Access Transport Areas (LATA.). There are over three hundred LATAs presently defined throughout the United States. As shown in FIG. 2, within each LATA, there are multiple MSC/VLR areas 150 each being served by an individual MSC/VLR (usually there is a one-to-one relationship between an MSC 40 and its VLR 30 and is often referenced collectively as a MSC/VLR).

FIG. 3 illustrates multiple location areas 160a–160f within a particular MSC area 150. A location area is a pact of the MSC service area in which a mobile station may move freely without updating location information to the MSC/VLR serving that location area. Therefore, a location area is the area where a paging message is broadcast to find the called mobile station for an incoming call. A location area identity (LAI) which identifies each location area is used by the mobile network to search for a mobile station in active state.

Further referring to FIG. 4, each location area 160 within a particular MSC coverage area 150 is further divided into multiple cell areas 170a–170f. Each cell is served by a separate antenna or base station. However, as described above, all cells within a single location area are served by the same MSC 40 and VLR 30. As a result, different cell areas 170 within a single location area 160 are distinguished using a Base Station Identity Code (BSIC) assigned to each serving base station or a Cell Global Identity (CGI) or Cell Identity (CI) assigned to each cell.

Signaling for telecommunications services is normally performed in a structured way. For example, specific predefined data, formats, and signals names are used to setup a speech connection, to perform handovers, and to authenticate mobile subscriber information when providing telecommunications service to a mobile subscriber. With the introduction of the Global System for Mobile (GSM) communications and the Personal Communications System (PCS), a number of new and advanced supplementary services are being provided to mobile subscribers. Since these supplementary services utilize user specified data, there are no structured ways to communicate these data between a serving Public Land Mobile Network (PLMN) and a mobile station. As a result, a number of unstructured message protocols have been developed for the GSM or PCS environment. One such protocol is the Short Message Service (SMS) protocol for one-way transporting of information between a PLMN and a mobile station. Another protocol is Unstructured Supplementary Service Data (USSD) which has been introduced to enable user interaction between GSM PLMN applications and a mobile station in a transparent way through the mobile telecommunications network. It is transparent because no review or manipulation of the contents of the message is performed during transportation.

Reference is now made to FIG. 5 where a block diagram illustrating the communication of a Short Message Service (SMS) message between a Short Message Service Center (SMS-C) 180 and the mobile station 20 is shown. The SMS-C 180 receives a string of alphanumeric characters to be transmitted to the mobile terminal 20. Such characters can be received from another telecommunications terminal or from a service operator. The SMS-C 180 encapsulates the entered character data into a packet message, such as Signaling System No. 7 (SS7) signals or X.25 protocol packets, arnd routes the message to a Short Message Service—Gateway Mobile Switching Center (SMS-GMSC) 190 within a PLMN 10 serving the mobile station 20. In a manner similar to the routing of an incoming call within a PLMN as described in FIG. 1, the SMS-GMSC 190 interrogates the home location register (HLR) 50 associated with the mobile station 20 for routing information (i.e., an identification of where the mobile station 20 is currently located) and subsequently routes the message to a Mobile Switching Center (MSC) 40 serving the mobile station's current location. The mobile station 20 is paged and a connection is set up between the mobile station 20 and the PLMN network 10. If the mobile station 20 is already busy, the connection setup is not performed because the network already knows that the mobile station 20 is accessible. If the connection has been successful, and thereby the mobile station 20 authenticated, the MSC 40 encapsulates the character data into an SMS message 210 and delivers the SMS message 210 to the mobile station 20 over one of the control data channels via a connected base station controller (BSC) 70. A control data channel such as a Stand-alone Dedicated Control Channel (SDCCH) is used instead of a traffic channel (TCH) to allow connection-less data communications. After receiving the SMS message 210 encapsulating the character data, the mobile station 20 acts merely as a buffer and passes the data to the attached Subscriber Identity Module (SIM) card 200. The SIM card 200 then stores the received data into an internal buffer or memory register. Lastly, if the delivery has been successful, a successful delivery report is sent back from the MS 20 to the serving MSC 40, and subsequently from the serving MSC 40 to the SMS-C 180. Otherwise, a failure report is generated.

By utilizing SMS messages and an SIM card, a subscriber feature provider within a telecommunications network can deliver the latest subscriber feature information to the mobile station 20 without requiring the mobile station 20 to be taken in for manual service. For example, whenever the mobile subscriber adds or deletes a new number from his speed dialing subscriber feature, the feature provider can remotely update the mobile station 20 with the mobile subscriber's latest speed dialing lists or options without inconveniencing the mobile subscriber. An application module associated with the mobile station 20 can further process and display the received data on a display unit attached to the mobile station 20 for user interaction.

FIG. 6 is a block diagram illustrating the communication of a USSD message 220 between a USSD external node user 250 and a mobile station 20. USSD messages are utilized by the mobile telecommunications network to transport user defined data to a mobile station 20 or an application module within the mobile station 20. Therefore, instead of storing the received character data into an SIM card, the received data are either directly manipulated by the feature application modules within the receiving mobile station 20 to provide special subscriber feature functions or displayed on a display unit for user interaction. Therefore, two parties within a mobile telecommunications network can utilize USSD messages to communicate text messages back and forth without establishing a speech connection.

The external node user 250, such as another telecommunications terminal or service provider, transmits a USSD message encapsulating the character data to the HLR 50 within the serving PLMN 10. The HLR 50 is associated with a number of different MSCs within the same PLMN 10. As the mobile station 20 travels from one MSC area to another, the HLR 50 receives location update signals and keeps record of the mobile station's current location. Whenever a USSD signal is received by the HLR 50, the HLR 50 ascertains the current location of the mobile station 20. A first USSD handler 230 within the HLR 50 thereafter transparently forwards the USSD signal to the appropriate MSC 40 currently serving the mobile station 20. A second USSD handler 240 within the serving MSC 40 receives the transmitted message and transports the USSD message 220 to the mobile station 20 over a connection-less communications link via a connected BSC 70. A third USSD handler 260 within the mobile station then receives the transmitted USSD message 220, extracts the encapsulated character data, and forwards the extracted data to the appropriate application module. One example of such an application module is a user interface module for displaying the received character data onto a display unit attached to the mobile station 20.

Conventionally, SMS and USSD messages are utilized to communicate user defined text messages from a telecommunications device within a telecommunications network to a particular mobile station or to all mobile stations traveling within a particular mobile switching center (MSC) coverage area. As a result, in order to communicate messages to mobile stations located within a certain geographic area., the telecommunications device generating the messages must inefficiently and inconveniently identify and specify the Mobile Subscriber Integrated Service Digital Network (MSISDN) number associated with each of the targeted mobile stations and sequentially transmit a message to the specified mobile stations. In order to avoid sequentially sending the message to each mobile station, as an alternative, the serving MSC can blindly transmit broadcast messages to all mobile stations located within its MSC service area.

Reference is now made to FIG. 7 illustrating the broadcasting of SMS messages to mobile stations located within a particular location area in accordance with the present invention. In accordance with the teachings of the present invention, a Mobile Subscriber Integrated Service Digital Network (MSISDN) number is assigned to a particular geographic area and associated with a telecommunications device serving that particular geographic area (FIG. 12, step 505). Thereinafter, whenever a telecommunications user wishes to transmit a message to all mobile stations located within the designated geographic area (FIG. 12, step 510), an SMS message encapsulating the message is routed utilizing the MSISDN number assigned to that particular geographic area as the destination address. For example, the SMS-C 180 receives a request to transmit an SMS message towards the MSISDN number associated with a particular location area. Not knowing that the specified MSISDN number represents a geographic location instead of a mobile station, the message is first routed to the SMS-GMSC 190 serving that particular PLMN 10 (FIG. 12, step 515). In a manner similar to the routing of a normal incoming SMS message, the SMS-GMSC 190 requests a routing instruction from the HLR 50 associated with the specified MSISDN number (signal 310; FIG. 12, steep 520). The HLR 50, storing a record specifying that the specified MSISDN number is being served by a particular MSC 40, further transmits a roaming number request towards the serving MSC 40 (signal 320; FIG. 12, step 525). Up to this process, no entity or device within the PLMN has determined that the specified MSISDN number does not represent a mobile station. The serving MSC then determines that the received MSISDN number is a number associated with a particular geographic area and, in order to receive the SMS message, returns a roaming number to the HLR 50 (signal 330; FIG. 12, step 530). The HLR 50 further forwards the received roaming number representing the serving MSC 40 back to the SMS-GMSC 190 (signal 340; FIG. 12, step 535). Utilizing the received roaming number, the SMS-GMSC 190 forwards the SMS message to the serving MSC 40 (FIG. 12, step 540). Upon receiving the SMS message (FIG. 12, step 545), a first application module 300 associated with the serving MSC 40 determines which location area is associated with this particular MSISDN number (FIG. 12, step 550). After making such a determination, the application module 300 queries the attached VLR 30 (FIG. 12, step 555). The attached VLR :30 already stores information reflecting which location area each mobile station is currently registered with. Accordingly, by querying the VLR 30, the serving MSC is able to ascertain the MSISDN numbers of the mobile stations located within the determined location area (FIG. 12, step 560).

Thereinafter, the received SMS message can be transmitted to each of the determined mobile stations (FIG. 12, step 565) in a number of different ways. In order to make minimum changes to the existing system, the first application module 300 within the serving MSC 40 can individually and sequentially transmit a message to each of the identified mobile stations using its corresponding MSISDN number. The serving MSC 40 sequentially instructs the serving BSC 70 to page each of the mobile stations 20*a*–20*c* and separately transmits the SMS message 210*a*–210*c* to the mobile stations 20*a*–20*c*, respectively. As another embodiment of the present invention, the first application module 300 within the serving MSC 40 can further transmit the received SMS data along with a list of MSISDN numbers to the BSC 70 serving that particular location area 160. A second application module 360 associated with the serving BSC 70 then transmits the received SMS data to each of the mobile stations as specified in the received MSISDN list.

Accordingly, the Emergency Service Bureau (ESB) can transmit emergency messages to all mobile stations located within a particular location area by transmitting an SMS message towards the MSISDN number associated with that particular location area. Once the message reaches an MSC serving that particular location area, the mobile stations currently traveling within the targeted location area are determined by querying the VLR and the emergency message is accordingly transmitted to each of the identified mobile stations.

A MSISDN number as described in FIG. 7 is assigned to a particular location area in order to reduce the impact to the existing SMS routing mechanism. The SMS-GMSC only receives MSISDN numbers and always requests routing instructions from an HLR associated with the received MSISDN number. As a result, even if the location area specified by the MSISDN number can never physically relocate to a different place, an HLR needs to be associated with the specified MSISDN number and be interrogated by the GMSC.

However, as another embodiment of the present invention, reference is now made to FIG. 8 illustrating the broadcasting of SMS messages to mobile stations located within a particular location area without performing a home location register (HLR) interrogation. Instead of assigning a MSISDN number to a particular location area, a wireline directory number is assigned to the particular location area and associated with a telecommunications device serving that particular location area. Thereinafter, whenever the SMS-C 180 receives a request to route an SMS message to a wireline directory number, a third application module 370 within the SMS-C 180 determines that the specified directory number is not a mobile number and transmits an application layer message 380, such as a Transaction Capabilities Application Part (TCAP) message, encapsulating the SMS message directly towards the serving MSC 40 associated with the specified wireline directory number. This is accomplished by transmitting a TCAP message using the received wireline directory number as a Signal Connection Control Part (SCCP) destination address. After receiving the TCAP signal, the first application module 300 within the serving MSC 490 extracts the encapsulated message and determines which location area 160 is associated with the specified wireline directory number. Thereinafter, in a manner similar to the methods and systems as described in FIG. 7, SMS messages 210*a*–210*c* are transmitted to mobile stations 20*a*–20*c*, respectively, located within the identified location area 160.

In accordance with the teachings of the present invention, a MSISDN number or wireline directory number can further be assigned to a particular cell area within a location area. Reference is now made to FIG. 9 illustrating the broadcasting of SMS messages to mobile stations located within a particular cell area 170. In case the directory number is assigned to a particular cell area, the SMS message is first routed to the MSC 40 serving that particular cell area. In a manner similar to storing data identifying the location area for each of the mobile stations traveling within a MSC coverage area, the attached VLR 30 further stores data identifying the cell area covering each mobile station. Such data may include Cell Global Identity (CGI) or Cell Identity (CI) identifying each cell area. As a result, upon querying the VLR 30, the first application module 300 determines the identities of the mobile stations traveling within the specified cell area, and in a manner similar to the method and system as described above, SMS messages are broadcast to each of the identified mobile stations.

Alternatively, the serving BSC 70 providing mobile service to the particular cell area 170 maintains data identifying the mobile stations currently located within the specified cell area 170. Accordingly, the serving MSC 40 transmits the received SMS message directly to the serving BSC 70. The second application module 360 associated with the serving BSC 70, in turn, determines which mobile stations are currently located within its coverage area 170 and transmits SMS Messages 210*a*–210*c* to the mobile stations 20*a*–20*c*, respectively.

As another embodiment of the present invention., reference is now made to FIG. 10 illustrating the serving MSC transmitting SMS messages to mobile stations located within a particular cell area 170. After receiving an SMS message with a directory number associated with a particular cell area, the serving MSC 40 determines the BSC 70 associated with the specified cell area 170 and transmits a signal requesting the identities of mobile stations currently located with the specified cell area 170 to the serving BSC 70 (signal 400). The second application module 360 within the serving BSC 70 ascertains the list of mobile stations currently being served by the BSC 70 and returns that list to the serving MSC 40 (signal 410). Utilizing the list of mobile stations received from the serving BSC 70, and in a, manner similar to the method and system as described above, the serving MSC 40 transmits SMS messages 210*a*–210*c* to the mobile stations 20*a*–20*c*, respectively (signal 420).

Figure 11:
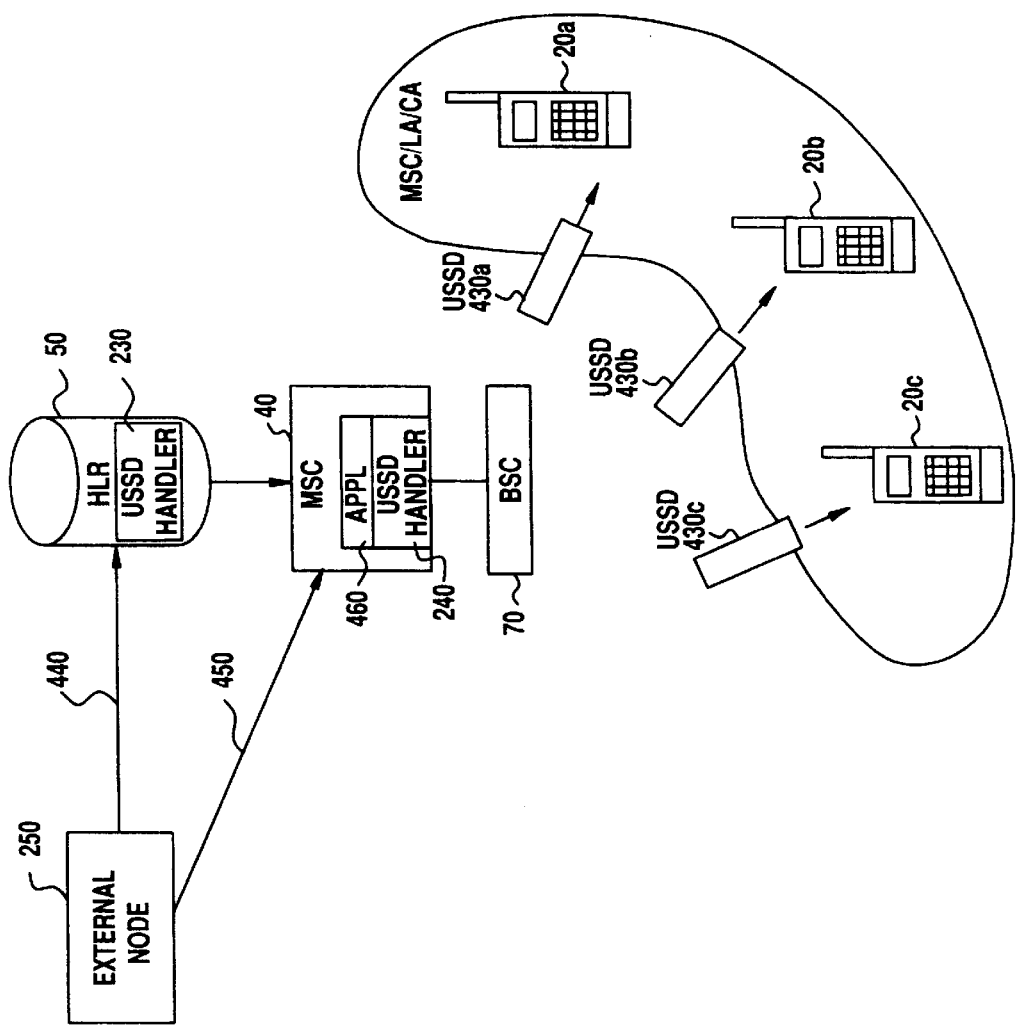
FIG. 11 is a block diagram illustrating the broadcasting of USSD messages from the serving MSC to mobile stations located within a particular service area.

As another alternative for broadcasting unstructured data to mobile stations, reference is now made to FIG. 11 illustrating the broadcasting of USSD messages to mobile stations traveling within a particular service area. An external node 250, such as a service provider, transmits a USSD message encapsulating the unstructured data to be broadcast using the MSISDN number assigned to that particular service area as a called party number. The transmitted USSD message is routed to the HLR associated with the specified called party number (signal 440). The USSD handler 230 associated with the HLR 50 determines the identity of the MSC 40 associated with the specified MSISDN number and, in turn, forwards the USSD message to the serving MSC 40. The USSD handler 240 associated with the MSC 40 then extracts the encapsulated unstructured data from the received USSD message. In a manner similar to the broadcasting of SMS messages as described in FIGS. 7–10, an application module 460 associated with the serving MSC 40 then determines the identity of the mobile stations currently located within the specified service area and broadcasts the USSD messages 430*a*–430*c* to the mobile stations 20*a*–20*c* via the BSC 70, respectively. As described above, the service area specified by the received MSISDN number may include a MSC coverage area, location area, or a cell area within a particular location area.

As another embodiment of the present invention for broadcasting USSD messages, a wireline directory number is assigned to a service area. Instead of transmitting a USSD message to the HLR 50, a USSD message or other connection-less signal is transmitted directly from the external node 250 to the MSC 40 serving that particular service area. Once the signal is received by the serving MSC, as described above, the application module 460 broadcasts the received data to the mobile stations traveling within the specified location area.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for communicating data to a plurality of mobile stations within a mobile telecommunications system, said plurality of mobile stations being served by a particular telecommunications device having a unique directory number and serving a plurality of geographic areas, wherein the unique directory number is associated with a particular one of said geographic areas, said method comprising the steps of:
   transmitting a connection-less signal towards said telecommunications device using said unique directory number as a destination address, the connection-less signal including data for mobile station delivery;
   receiving said connection-less signal with included data at said telecommunications device;
   identifying a plurality of mobile stations being served by said telecommunications device and being located within said particular one of the geographic areas; and
   transmitting a plurality of messages encapsulating said included data, wherein each of said plurality of messages is transmitted towards one of said identified plurality of mobile stations by said telecommunications device.

2. The method of claim 1 wherein said step of transmitting said received data further comprises the step of transmitting a Short Message Service (SMS) message encapsulating said included data.

3. The method of claim 1 wherein said step of transmitting said included data further comprises the step of transmitting an Unstructured Supplementary Service Data (USSD) message encapsulating said included data.

4. The method of claim 1 wherein said telecommunications device serves a plurality of geographic areas and said unique directory number is associated with a particular one of said plurality of geographic areas and wherein said step of identifying said plurality of mobile stations further comprises the step of identifying mobile stations located within said particular one of said plurality of geographic areas.

5. The method of claim 1 wherein said telecommunications device comprises a mobile switching center (MSC) serving said plurality of mobile stations and wherein said plurality of geographic areas include a plurality of location areas.

6. The method of claim 1 wherein said telecommunications device comprises a base station controller (BSC) serving said plurality of mobile stations and wherein said plurality of geographic areas include a plurality of: cell areas.

7. The method of claim 1 wherein said unique directory number comprises a Mobile Station Integrated Service Digital Network (MSISDN) number assigned to said telecommunications device.

8. The method of claim 1 wherein said unique directory number comprises a dialable wireline directory number.

9. The method of claim 1 wherein said step of identifying a plurality of mobile stations being served by said telecommunications device further comprises the step of communicating with a visitor location register (VLR) associated with said telecommunications device.

10. A method for communicating data to a plurality of mobile stations traveling within a particular geographic area, said method comprising the steps of:
    assigning a unique directory number to a particular one of a plurality of geographic areas being served by a telecommunications device providing mobile service to mobile stations;
    transmitting a signal encapsulating data to said telecommunications device using said unique directory number of the particular one of the geographic areas as a destination address;
    receiving said transmitted signal at said telecommunications device;
    determining the identity of a plurality of mobile stations located within said particular one of the geographic areas represented by said received unique directory number; and
    communicating a plurality of connection-less signals encapsulating said data, wherein each of said plurality of connection-less signals is transmitted towards one of said plurality of identified mobile stations.

11. The method of claim 10 wherein said unique directory number includes a Mobile Subscriber Integrated Service Digital Network (MSISDN) number assigned to said telecommunications device.

12. The method of claim 10 wherein said unique directory number includes a wireline directory number assigned to said telecommunications device.

13. The method of claim 10 wherein said particular geographic area comprises a location area and said telecommunications device comprises a mobile switching center serving said location area.

14. The method of claim 10 wherein said particular geographic area comprises a cell area and said telecommunications device comprises a base station controller serving said cell area.

15. The method of claim 10 wherein said step of transmitting said connection-less signal comprises the step of transmitting a short message service (SMS) signal over a control channel to said each of said plurality of mobile stations traveling within said geographic area.

16. A system for communicating data to a plurality of mobile stations traveling within a particular geographic area, said system comprising:
- a telecommunications device providing mobile service to mobile stations within a plurality of geographic areas, wherein a Particular one of the geographic areas is assigned a unique directory number;
- means for routing a signal encapsulating said data towards said telecommunication device using said unique directory number of the particular one of the geographic areas as a destination address;
- means for receiving said signal encapsulating said data at said telecommunications device;
- means for determining the identity of a plurality of mobile stations located within said particular geographic area assigned the unique directory number; and
- means for communicating a plurality of connection-less signals encapsulating said data, wherein each of said plurality of connection-less signals is transmitted towards one of said plurality of identified mobile stations.

17. The system of claim 16 wherein said unique directory number includes a Mobile Subscriber Integrated Service Digital Network (MSISDN) number assigned to said telecommunications device.

18. The system of claim 16 wherein said unique directory number includes a wireline directory number assigned to said telecommunications device.

19. The system of claim 16 wherein said particular geographic area comprises a location area and said telecommunications device comprises a mobile switching center serving said location area.

20. The system of claim 16 wherein said particular geographic area comprises a cell area and said telecommunications device comprises a base station controller serving said cell area.

21. The system of claim 16 wherein said means for transmitting said connection-less signal further comprises means for transmitting a short message service (SMS) signal over a control channel to said each of said plurality of mobile stations traveling within said geographic area represented by said received unique directory number.

* * * * *

UNITED STATES PATENT AND TRADEMARK OFFICE
CERTIFICATE OF CORRECTION

PATENT NO. : 6,052,591  
DATED : April 18, 2000  
INVENTOR(S) : Bhatia

Page 1 of 2

It is certified that error appears in the above-indentified patent and that said Letters Patent is hereby corrected as shown below:

Inserts

| | |
|---|---|
| Column 1, line 30 | Replace "US:SD" With --USSD-- |
| Column 2, line 29 | Replace "ESC" With --BSC-- |
| Column 3, line 37 | Replace "IILR" With --HLR-- |
| Column 4, line 37 | Replace "PLM" With --PLMN-- |
| Column 5, line 10 | Replace "EMS" With --SMS-- |
| Column 5, line 27 | Replace "subscribers" With --subscriber's-- |
| Column 7, line 24 | Replace "EMS" With --SMS-- |

UNITED STATES PATENT AND TRADEMARK OFFICE
CERTIFICATE OF CORRECTION

PATENT NO. : 6,052,591
DATED : April 18, 2000
INVENTOR(S) : Bhatia

It is certified that error appears in the above-indentified patent and that said Letters Patent is hereby corrected as shown below:

Column 8, line 15  Replace "(CG.I)"
                   With --(CGI)--

Column 8, line 40  Replace "BSDC"
                   With --BSC-

Column 8, line 50  Replace "FIG. :L1"
                   With --FIG 11--

Column 16, line 19  Replace "of:"
                    With --of--

Column 17, line 11  Replace "Particular"
                    With --particular--

Signed and Sealed this

Fifteenth Day of May, 2001

Attest:

NICHOLAS P. GODICI

Attesting Officer        Acting Director of the United States Patent and Trademark Office